No. 737,473. Patented August 25, 1903.

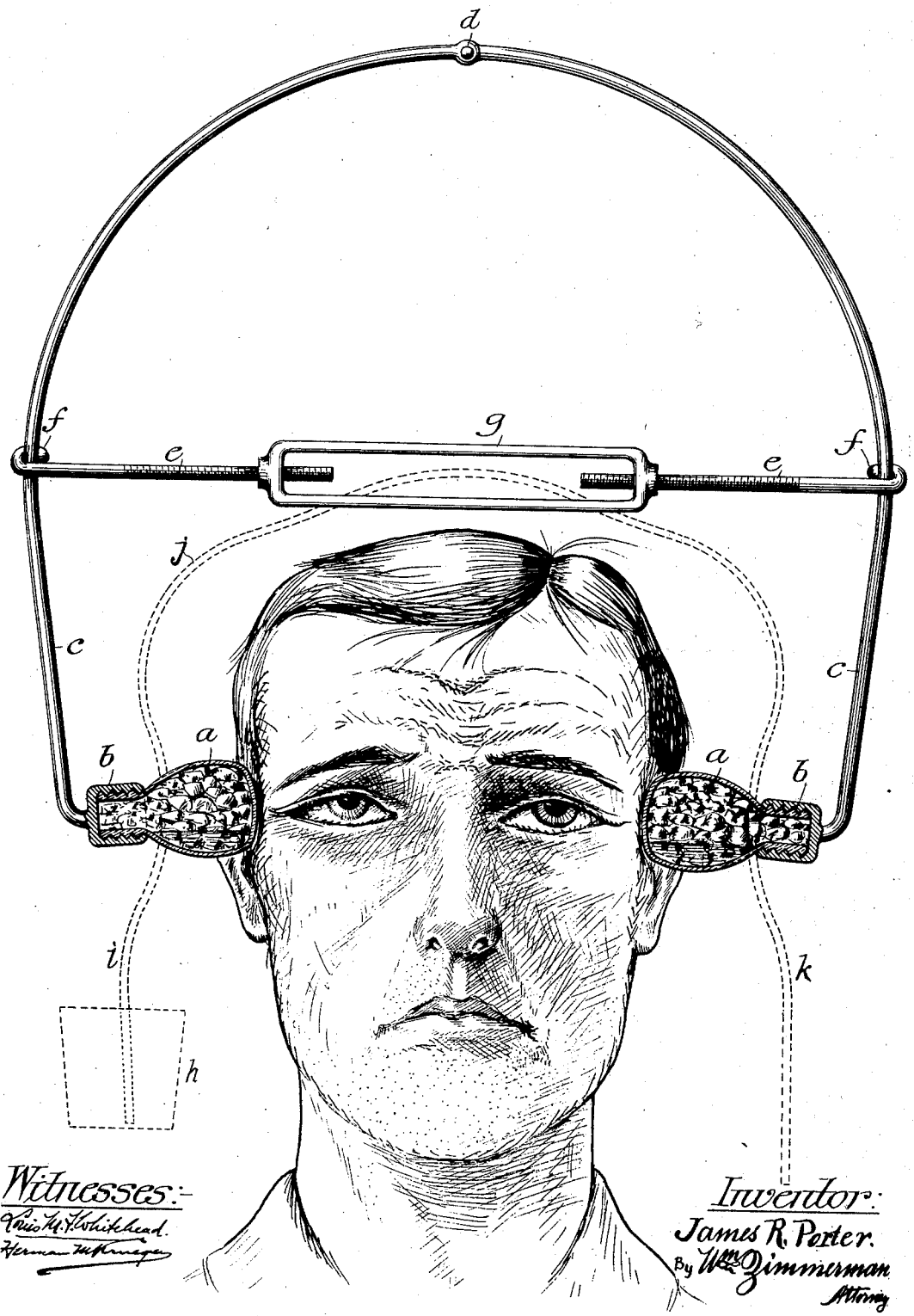

UNITED STATES PATENT OFFICE.

JAMES R. PORTER, OF RICHMOND, ILLINOIS.

MECHANISM FOR RELIEF OF HEADACHE AND INSOMNIA.

SPECIFICATION forming part of Letters Patent No. 737,473, dated August 25, 1903.

Application filed April 8, 1903. Serial No. 151,655. (No model.)

*To all whom it may concern:*

Be it known that I, JAMES R. PORTER, a citizen of the United States, residing at Richmond, in the county of McHenry and State of Illinois, have invented certain new and useful Improvements in Mechanism for the Relief of Insomnia and Headache, which is fully set forth in the following specification, reference being had to the accompanying drawing, forming a part hereof.

The object of my invention is to produce a device through the function of which the pains known as "headache" and "insomnia" may be relieved or cured.

To attain said desirable end, I construct a mechanical device and apply it substantially as shown and hereinafter described.

It is a well-known fact that there is more or less fever or heat in certain regions of the head, especially at the sides or temples, during the continuance of a headache or a condition of insomnia. I have acted on said well-known facts and experimented with mechanical contrivances by means of which I have realized very satisfactory results. My preferred construction of said mechanism consists of glass bulbs $a$ of such shape as is adapted to fit over the larger area of the temple as nearly as possible, glass being the preferred material, although brass, copper, aluminium, celluloid, and similar materials which are good conductors of heat will answer the purpose. Said bulbs $a$ are filled with ice-water or ice, or salt and water, or like cooling substances and secured in the sockets $b$, which form integral parts each of the arms $c$, which are each bent into the form of a semiarch and connected by a hinge-joint $d$ at the central point of the arch. Said joint in said arch is not, however, indispensable, especially if the arms $c$ are of sufficient elasticity. To each of said arms $c$ is attached a threaded rod $e$ by means of a hook $f$, loosely enough so that it may by a little force be adjusted longitudinally on said arms. Said arms are connected by a turnbuckle $g$, whereby said arms may be drawn or pressed toward the head of the user of the device with more or less force by the suitable adjustment of said turnbuckle mechanism in its relative nearness to the bulbs and the elasticity of the said arms.

My experience has proved that both cold and pressure on the temples is the most advantageous for good results for either of said troubles. When necessary, a vessel $h$, containing a sufficient supply of a cooling fluid, may produce a long-continued and maximum result by being connected to the tubes $i\ j\ k$, adapted to pass said fluid through said bulbs and to act as a siphon, as shown, all said parts being shown in broken outlines.

What I claim is—

1. The combination with refrigerating-bulbs, and means to hold them, of mechanism to regulably adjust the pressure, toward each other, of said bulbs, substantially as specified.

2. The combination with refrigerating-bulbs and arched and connected arms to hold them, of mechanism, adjustable on said arms, to regulably press said bulbs toward each other, substantially as specified.

3. The combination with refrigerating-bulbs and jointed elastic arms to hold them, of mechanism, adjustable on said arms, to regulably press said bulbs toward each other, substantially as specified.

4. The combination with refrigerating-bulbs and means to hold them and to supply refrigerating material in a moving stream, of mechanism to regulably adjust the pressure toward each other of said bulbs, substantially as specified.

JAMES R. PORTER.

Witnesses:
J. N. BURTON,
JOHN KELLEY.